(12) United States Patent
Miyakawa et al.

(10) Patent No.: US 10,009,331 B2
(45) Date of Patent: Jun. 26, 2018

(54) INFORMATION PROCESSING DEVICE, SYSTEM, METHOD, AND MEDIUM

(71) Applicant: PFU LIMITED, Kahoku-shi, Ishikawa (JP)

(72) Inventors: Osamu Miyakawa, Kahoku (JP); Hitoshi Matsuo, Kahoku (JP); Shinsuke Hamano, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 181 days.

(21) Appl. No.: 14/990,638

(22) Filed: Jan. 7, 2016

(65) Prior Publication Data

US 2017/0085572 A1    Mar. 23, 2017

(30) Foreign Application Priority Data

Sep. 18, 2015  (JP) ................................. 2015-185623

(51) Int. Cl.
  *H04L 29/06* (2006.01)
(52) U.S. Cl.
  CPC .......... *H04L 63/08* (2013.01); *H04L 63/0807* (2013.01); *H04L 63/10* (2013.01)
(58) Field of Classification Search
  None
  See application file for complete search history.

(56) References Cited

U.S. PATENT DOCUMENTS

| | | | |
|---|---|---|---|
| 7,325,058 B1 * | 1/2008 | Sheth | H04L 12/4633 709/223 |
| 7,343,619 B2 * | 3/2008 | Ofek | H04L 47/10 709/225 |

(Continued)

FOREIGN PATENT DOCUMENTS

| | | |
|---|---|---|
| JP | 2003-204335 A | 7/2003 |
| JP | 2005-176099 A | 6/2005 |

(Continued)

OTHER PUBLICATIONS

Katehakis, Dimitriios G., et al. Delivering a Lifelong Intergrated Electronic Health Record Based on a Service Oriented Architecture. IEEE Transactions on Information Technology in Biomedicine. vol. 11, Issue: 6. Pub. Date: 2007. http://ieeexplore.ieee.org/stamp/stamp.jsp?tp=&arnumber=4358289.*

(Continued)

*Primary Examiner* — Jeremiah Avery
(74) *Attorney, Agent, or Firm* — Westerman, Hattori, Daniels & Adrian, LLP

(57) ABSTRACT

An information processing device including: a connection setting retaining unit which retains a connection setting of a connection to an access point that relays communication to a network for each access point; an access permission retaining unit which retains a token for using a service provided by a server on the network; a determining unit which determines whether or not the connection setting is a connection setting having been set using a tool that enables the connection setting and a usage setting of the service to be set in a series of procedures; and a service using unit which uses the service using the token in a communication relayed by an access point related to a connection setting determined to be a connection setting having been set using the tool.

9 Claims, 8 Drawing Sheets

(56) References Cited

U.S. PATENT DOCUMENTS

| | | | |
|---|---|---|---|
| 7,512,683 B2* | 3/2009 | Anschutz | H04L 12/2859 370/395.2 |
| 7,653,200 B2* | 1/2010 | Karmi | H04L 12/5692 380/270 |
| 7,673,327 B1* | 3/2010 | Polis | G06F 17/3089 713/151 |
| 8,234,687 B2* | 7/2012 | Baumhof | G06F 21/606 709/223 |
| 8,589,541 B2* | 11/2013 | Raleigh | H04L 41/0893 709/224 |
| 8,613,070 B1* | 12/2013 | Borzycki | G06F 21/6218 726/8 |
| 8,667,575 B2* | 3/2014 | Thakur | G06F 21/41 726/12 |
| 9,319,913 B2* | 4/2016 | Raleigh | H04L 41/0893 |
| 2003/0115339 A1 | 6/2003 | Hodoshima | |
| 2004/0230797 A1* | 11/2004 | Ofek | G06F 21/14 713/168 |
| 2005/0148326 A1 | 7/2005 | Nogawa et al. | |
| 2006/0034234 A1 | 2/2006 | Watanabe | |
| 2010/0107226 A1* | 4/2010 | Grabelsky | H04L 63/102 726/4 |
| 2010/0253788 A1 | 10/2010 | Okano | |
| 2013/0198806 A1* | 8/2013 | Takatsu | G06F 3/1222 726/3 |
| 2016/0191482 A1* | 6/2016 | Truelove | H04L 63/0807 726/9 |

FOREIGN PATENT DOCUMENTS

| | | |
|---|---|---|
| JP | 2006-54577 A | 2/2006 |
| JP | 2009-211431 A | 9/2009 |
| JP | 2010-181927 A | 8/2010 |
| JP | 2010-245839 A | 10/2010 |
| JP | 2015-90650 A | 5/2015 |
| JP | 2015-138392 A | 7/2015 |

OTHER PUBLICATIONS

Zaghloul, Said; Jukan, Admela. On the Performance of the AAA Systems in 3G Cellular Networks. IEEE International Conference on Communications, 2007. ICC '07. Pub. Date: 2007. http://ieeexplore.ieee.org/stamp/stamp.jsp?tp=&arnumber=4289019.*

Niinimaki, Tuomas. Face-to-face, Email and Instant Messaging in Distributed Agile Software Development Project. 2011 Sixth IEEE International Conference on Global Software Engineering Workshop (ICGSEW). Pub. Date: 2011. http://ieeexplore.ieee.org/stamp/stamp.jsp?tp=&arnumber=6065582.*

Notice of Reason for Rejection dated Aug. 9, 2016, issued in Japanese Application No. 2015-185623, with English translation (15 pages).

Networld Corporation, "Guide to purchase, ISM Cloud One", searched on Jul. 31, 2015, http://www.netwoldco.jp/nwaas/guide_ism.htm, with partial English translation (3 pages).

* cited by examiner

FIG. 4

| ESSID | AUTHENTICATION METHOD | ENCRYPTION METHOD | SECURITY KEY | ... | ACTIVATION BIT |
|---|---|---|---|---|---|
| α | WPA2 | AES | xxxx | | 1 (VALID) |
| β | WPA2 | AES | yyyy | | 0 (INVALID) |
| ⋮ | ⋮ | ⋮ | ⋮ | ⋮ | ⋮ |

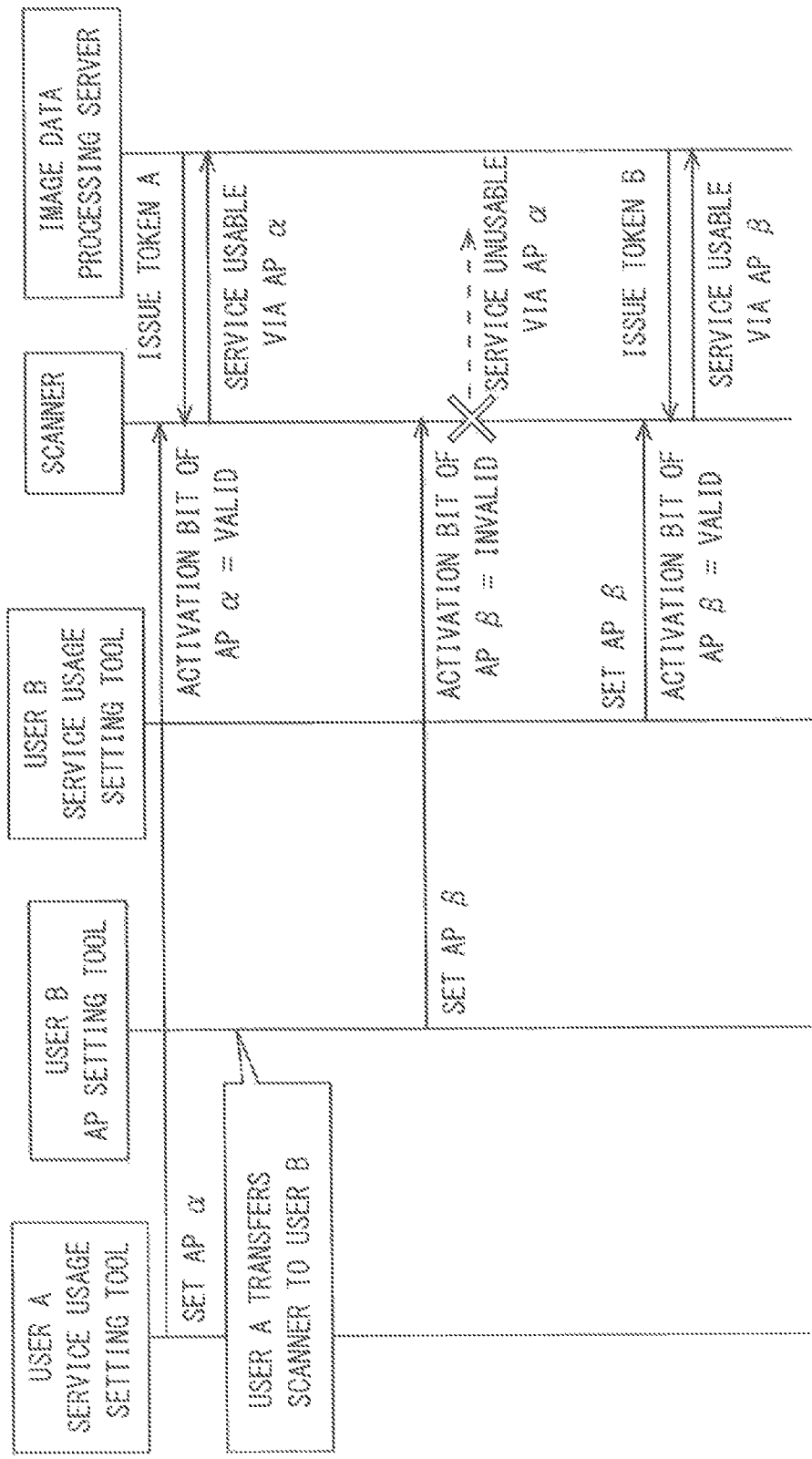

INFORMATION PROCESSING DEVICE, SYSTEM, METHOD, AND MEDIUM

CROSS-REFERENCE TO RELATED APPLICATION

This application is based upon and claims the benefit of priority of the prior Japanese Patent Application No. JP2015-185623, filed on Sep. 18, 2015, the entire contents of which are incorporated herein by reference.

FIELD

The present disclosure relates to a technique for providing a service via a network.

BACKGROUND

Conventionally, a terminal device is proposed which includes: an authentication condition determining unit which determines whether or not at least two conditions are satisfied among a first condition requiring that a time when an input operation is performed on the terminal device is within a set time slot, a second condition requiring that a location of the terminal device is a set location, and a third condition requiring that a communication state of the terminal device is a set state; and an authentication processing unit which performs an authentication process when the authentication condition determining unit determines that at least two conditions are satisfied (refer to Japanese Patent Application Publication No. 2015-90650).

In addition, a technique is proposed which enables a wireless access point where a determined device is wirelessly connected to be selected by displaying a list of parameter groups respectively corresponding to wireless access points and having a user perform an operation of selecting any of the wireless access points on the list (refer to Japanese Patent Application Publication No. 2015-176099).

Furthermore, there is a technique which, when an information processing device is determined to be included in a range indicated by range information by a determining unit, a process executing unit performs a prescribed process indicated by process identification information associated with the range information (refer to Japanese Patent Application Publication No. 2009-211431). There is also a technique that provides a setting for permitting connection only to a wireless LAN specified by an administrator (refer to "ISM CloudOne Purchase Guide", Networld Corporation, [online], [retrieved Jul. 31, 2015], Internet (URL: http://www.networld.co.jp/nwaas/guide_ism.htm).

SUMMARY

An example of the present disclosure is an information processing device including: a connection setting retaining unit which retains a connection setting of a connection to a relay point that relays communication to a network for each relay point; an access permission retaining unit which retains an access permission for using a prescribed service provided by a server on the network; a determining unit which determines whether or not the connection setting is a connection setting having been set using a tool that enables the connection setting and a usage setting of the prescribed service to be set in a series of procedures; and a service using unit which uses the prescribed service using the access permission in a communication relayed by a relay point related to a connection setting determined to be a connection setting having been set using the tool.

The present disclosure may be viewed as an information processing device, a system, a method that is executed by a computer, and a program to be executed by a computer. In addition, the present disclosure may be viewed as a recording of such a program on a recording medium that is readable by a device such as a computer, a machine, or the like. In this case, a recording medium that is readable by a computer or the like refers to a recording medium which stores information such as data and programs by an electric action, a magnetic action, an optical action, a mechanical action, or a chemical action and which can be read by a computer or the like.

BRIEF DESCRIPTION OF THE DRAWINGS

FIG. 4 is a diagram showing a connection setting of an access point according to an embodiment;

FIG. 8 is a diagram for explaining a usage state of a service when a scanner according to an embodiment is actually operated.

DESCRIPTION OF EMBODIMENTS

Hereinafter, an embodiment of an information processing device, a system, a method, and a program according to the present disclosure will be described with reference to the drawings. However, it should be noted that the embodiment described below merely exemplifies the present disclosure and is not intended to limit an information processing device, a system, a method, and a program according to the present disclosure to the specific configurations described below. When implementing the present disclosure, a specific configuration may be adopted as appropriate in accordance with each embodiment. In addition, various improvements and modification may be made to the present disclosure.

As the present embodiment, an embodiment in which an information processing device, a system, a method, and a program according to the present disclosure are implemented in a system interlocked with a scanner will be described. However, an information processing device, a system, a method, and a program according to the present disclosure can be widely used with respect to techniques for providing services via a network. Accordingly, objects of application of the present disclosure are not limited to the examples described in the present embodiment.

<Configuration of System>

Figure 1:
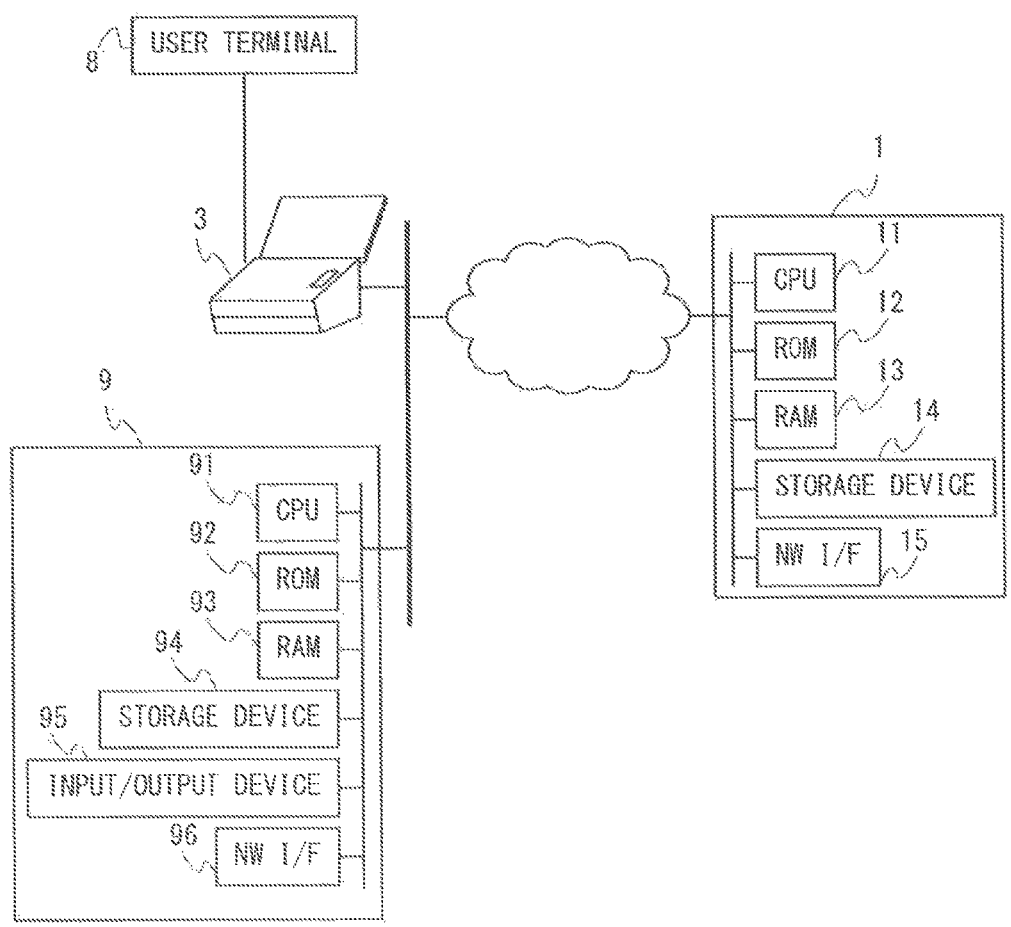
FIG. 1 is a schematic diagram showing a configuration of a system according to an embodiment.

FIG. 1 is a schematic diagram showing a configuration of a system according to the present embodiment. The system according to the present embodiment includes a scanner 3 and an image data processing server 1 which are connected via a network such as the Internet or a wide area network.

The image data processing server 1 is a computer including a central processing unit (CPU) 11, a read only memory (ROM) 12, a random access memory (RAM) 13, a storage device 14 that is an electrically erasable and programmable read only memory (EEPROM), a hard disk drive (HDD), or the like, a communicating unit 15, and the like. Moreover, while the image data processing server 1 is shown to be a computer housed in a single case for the sake of simplicity, in the present embodiment, the image data processing server 1 provides an image data processing service to a user by having a part of or all of its functions executed by a device installed at a remote location or by a plurality of devices installed in a distributed manner through the use of cloud technology or the like. However, the configuration of the image data processing server 1 is not limited to the configuration exemplified in the present embodiment.

Figure 2:
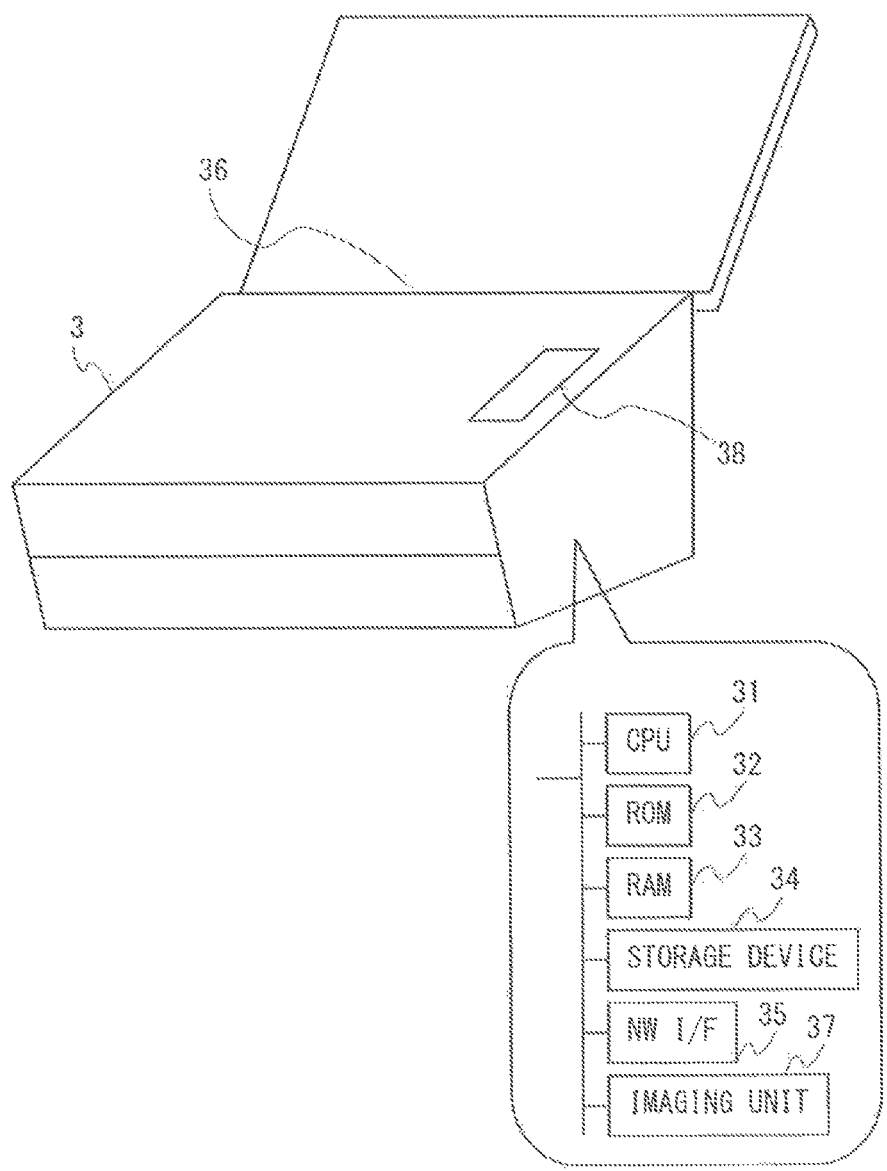
FIG. 2 is a diagram showing a hardware configuration of a scanner according to an embodiment.

FIG. 2 is a diagram showing a hardware configuration of the scanner 3 according to the present embodiment. The scanner 3 is a device which acquires image data by capturing an image of an original document such as a document, a name card, a receipt, and a photograph/illustration set by the user and is an imaging device including a sheet feeder 36 that feeds an original document to an imaging unit 37, the imaging unit 37, a scan button 38, a CPU 31, a ROM 32, a RAM 33, a storage device 34, a communicating unit 35, and the like. Moreover, while a scanner 3 adopting an image system in which images of an original document set in the sheet feeder 36 are captured while the original document is being automatically fed is exemplified in the present embodiment, the imaging system of a scanner is not limited to such a system. For example, a scanner of a type in which an image of an original document set at a reading position by the user may be used. In addition, while an example of using the scanner 3 as an imaging device used in the present system is described in the present embodiment, the imaging device used in the present system is not limited to a scanner. For example, a camera may be adopted as an imaging device.

The scanner 3 according to the present embodiment is capable of connecting to a wireless LAN due to being provided with a wireless communication function. In addition, while the scanner 3 according to the present embodiment includes a scan button 38 that is pressed or touched by the user to instruct the scanner 3 to capture an image, the scanner 3 does not include a user interface that enables character input/output and item selection such as a touch panel display and a keyboard nor does it include a web browser function and a server function. However, communicating means, hardware configuration, and the like of a scanner capable of adopting the method according to the present embodiment are not limited to those exemplified in the present embodiment.

In addition, a user terminal 9 such as a so-called smartphone, a tablet, and a personal computer is connected to the system according to the present embodiment (refer to FIG. 1). The user terminal 9 is a computer including a CPU 91, a ROM 92, a RAM 93, a storage device 94, an input/output device 95, a communicating unit 96, and the like. As shown in FIG. 1, the user terminal 9 may communicate with the scanner 3 and the image data processing server 1 by being connected to a local network to which the scanner 3 is connected or may communicate with the scanner 3 and the image data processing server 1 by being connected to a mobile phone network.

Furthermore, a user terminal 8 that is a personal computer or the like is connected to the system according to the present embodiment. The user terminal 8 is a computer including a CPU, a ROM, a RAM, a storage device, an input/output device, and a communication interface such as a USB (illustration of the hardware configuration will be omitted). As shown in FIG. 1, the user terminal 8 is connected to the scanner 3 via an interface such as a USB. In the present embodiment, the user terminal 8 does not communicate with the image data processing server 1.

Figure 3:
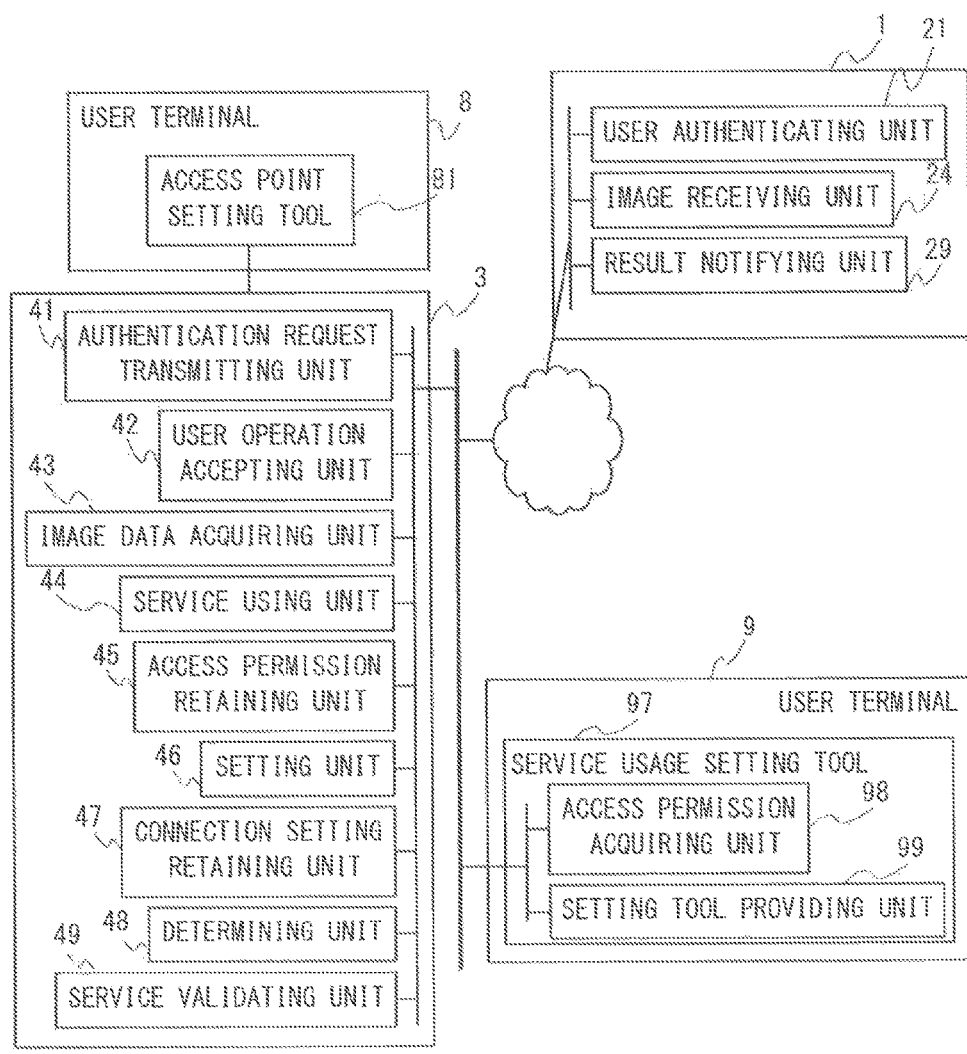
FIG. 3 is a diagram schematically showing a functional configuration of a system according to an embodiment.

FIG. 3 is a diagram schematically showing a functional configuration of the system according to the present embodiment. As respective hardware included in the image data processing server 1 are controlled by having a program recorded in the storage device 14 read by the RAM 13 and executed by the CPU 11, the image data processing server 1 functions as a device that includes a user authenticating unit 21, an image receiving unit 24, and a result notifying unit 29. Moreover, in the present embodiment, the respective functions of the image data processing server 1 are executed by the CPU 11 that is a general purpose processor. Alternatively, a part of or all of the functions may be executed by one or a plurality of dedicated processors.

In response to an authentication request transmitted from the user terminal 9 or the scanner 3, the user authenticating unit 21 authenticates a user of the user terminal 9 or the scanner 3. The authentication request includes authentication information necessary for authentication. In the present embodiment, while a user ID and a password are used as authentication information, other information may be used as authentication information. Moreover, since the scanner 3 according to the present embodiment does not include a user interface that enables character input/output and item selection as described earlier, an authentication request is transmitted to the image data processing server 1 using authentication information notified from the user terminal 9 to the scanner 3.

In the present embodiment, an access token is used to authenticate a user. Upon receiving an authentication request from the user terminal 9 or the scanner 3, the user authenticating unit 21 verifies authentication information included in the authentication request, and when the authentication information is appropriate, transmits an access token to a transmission source of the authentication request (the user terminal 9 or the scanner 3). The user terminal 9 or the scanner 3 having received the access token thereafter communicates with the image data processing server 1 using the access token.

The image receiving unit 24 receives, via the network, image data which is acquired by and transmitted from the user-authenticated scanner 3.

The result notifying unit 29 performs a result notification to notify the user of a result (completion, failure, and the like) of processing of received image data.

A service usage setting tool 97 (when the server is a cloud service, the term "cloud setting tool" may be used instead) that is software for using the system according to the present embodiment is installed in advance in the user terminal 9. The service usage setting tool 97 is a tool that enables a setting of an access point and a setting of a service to be set in a series of procedures, and enables an access point, usage of the image data processing server, and the like to be set via the network with respect to the scanner 3. In addition, the service usage setting tool 97 enables creating an account, logging into and logging out from the account, configuring the account, and the like on the image data processing server 1 via the network. As a result, with the system according to the present embodiment, by simply operating the user terminal 9 to complete preparations related to the entire system, setting an original document on the scanner 3, and operating the scan button 38, the user can transmit data obtained from the original document to the image data processing server.

As the service usage setting tool 97 recorded in the storage device 94 is read out to the RAM 93 and executed by the CPU 91, the user terminal 9 functions as a device including an access permission acquiring unit 98 and a setting tool providing unit 99. Moreover, in the present embodiment, the respective functions of the user terminal 9 are executed by the CPU 91 that is a general purpose processor. Alternatively, a part of or all of the functions may be executed by one or a plurality of dedicated processors.

The access permission acquiring unit 98 logs into the image data processing server 1 and acquires an access token (access permission) for using an image data processing service.

The setting tool providing unit 99 communicates with the scanner 3 in a state where an access token has been acquired and provides the user with the service usage setting tool 97 that enables a connection setting and a usage setting for using the image data processing service with the access token to be set in a series of procedures. In other words, the service usage setting tool 97 is software to be executed on the user terminal 9 having acquired an access token for using the image data processing service (the user terminal 9 having logged into the image data processing server).

An access point setting tool 81 (software) for using the system according to the present embodiment is installed in the user terminal 8 in advance. Due to the access point setting tool 81 recorded in the storage device being read out to the RAM and executed by the CPU, the user terminal 8 can set a wireless access point with respect to the scanner 3 via an interface such as a USB.

However, unlike the service usage setting tool 97, the access point setting tool 81 does not allow settings for using the image data processing server (service usage setting) such as creating an account, logging into and logging out from the account, and configuring the account with respect to the image data processing server 1 to be performed. Using the access point setting tool 81, the user can perform a setting for directly fetching image data (without involving the image data processing server 1) from the scanner 3 to the user terminal 8, the user terminal 9, or the like. By simply operating the user terminal 8 to complete preparations in a local environment, setting an original document on the scanner 3, and operating the scan button 38, the user can transmit data obtained from the original document to a locally connected terminal such as the user terminal 8, the user terminal 9, or the like.

As respective hardware included in the scanner 3 are controlled by having a program recorded in the storage device 34 read by the RAM 33 and executed by the CPU 31, the scanner 3 functions as a device that includes an authentication request transmitting unit 41, a user operation accepting unit 42, an image data acquiring unit 43, a service using unit 44, an access permission retaining unit 45, a setting unit 46, a connection setting retaining unit 47, a determining unit 48, and a service validating unit 49. Moreover, in the present embodiment, the respective functions of the scanner 3 are executed by the CPU 31 that is a general purpose processor. Alternatively, a part of or all of the functions may be executed by one or a plurality of dedicated processors.

The authentication request transmitting unit 41 transmits an authentication request (a token request) including authentication information (a user ID and a password) notified to the imaging device from the user terminal 9 (a smartphone or the like) executing the service usage setting tool 97 to the image data processing server 1.

The user operation accepting unit 42 accepts a prescribed user operation. In the present embodiment, as the prescribed user operation, pressing or touching the scan button 38 provided on the scanner 3 is accepted as a user operation for collectively instructing a series of processes from starting a scan to transmitting data to the image data processing server. However, the prescribed user operation that triggers a scan to start is not limited to the example according to the present disclosure.

When the prescribed user operation is accepted by the user operation accepting unit 42, the image data acquiring unit 43 acquires image data by capturing an image of an object. Specifically, when an operation of the scan button 38 is accepted by the user operation accepting unit 42, the image data acquiring unit 43 of the scanner 3 according to the present embodiment acquires image data of an original document by controlling the sheet feeder 36 to send the original document to the imaging unit 37 and then controlling the imaging unit 37 to capture an image of the original document.

The service using unit 44 uses the image data processing service using an access token in a communication relayed by an access point related to a connection setting that is determined to be a connection setting having been set using the service usage setting tool 97. For example, the service using unit 44 transmits image data acquired by the image data acquiring unit 43 to an account of the user in the image data processing service using the access token.

The access permission retaining unit 45 retains an access token for using the image data processing service provided by the image data processing server 1.

The setting unit 46 communicates with the user terminal 9 executing the service usage setting tool 97 and performs a connection setting and a usage setting of the image data processing service. Moreover, in a case where an access token is already retained by the access permission retaining unit 45 when a usage setting of the image data processing service is performed, the setting unit 46 overwrites the access token with the access token related to the new usage setting.

The connection setting retaining unit 47 retains a connection setting of a connection to an access point that relays communication to the network for each access point.

The determining unit 48 determines whether or not a connection setting is a connection setting set using the service usage setting tool 97 that enables the connection setting and a usage setting of the image data processing service to be set in a series of procedures. Specifically, the determining unit 48 determines whether or not a connection setting is a connection setting set using the service usage setting tool 97 by referring to a service usage setting (an activation bit) in the connection setting.

The service validating unit 49 performs a service usage setting indicating whether or not the image data processing service is to be used in a connection setting. Specifically, the service usage setting is an activation bit included in the connection setting of an access point, and when the connection setting is a connection setting set using the service usage setting tool 97, the service validating unit 49 sets the activation bit in the connection setting to a value indicating "valid". On the other hand, when the connection setting is not a connection setting set using the service usage setting tool 97, the service validating unit 49 does not set the activation bit in the connection setting to a value indicating "valid" (specifically, a value indicating "invalid" is set or an activation bit is not included in the connection setting).

FIG. 4 is a diagram showing a connection setting of an access point according to the present embodiment. In the connection setting of an access point, for each access point set using the access point setting tool 81 or the service usage setting tool 97, a service usage setting (an activation bit) is retained in addition to information necessary for communicating with the access point such as an ID of the access point (ESSID), an authentication method, an encryption method, a security key, and the like. In the activation bit, a value indicating "valid" is set for a connection setting having been set using the service usage setting tool 97 and a value indicating "invalid" is set for a connection setting having been set using the access point setting tool 81.

<Flow of Processes>

Next, a flow of processes executed by the system according to the present embodiment will be described. It is to be understood that specific contents and a specific sequence of processes described below merely represent one example of implementing the present disclosure. Specific contents and sequences of the processes may be appropriately selected in accordance with embodiments of the present disclosure.

Figure 5:
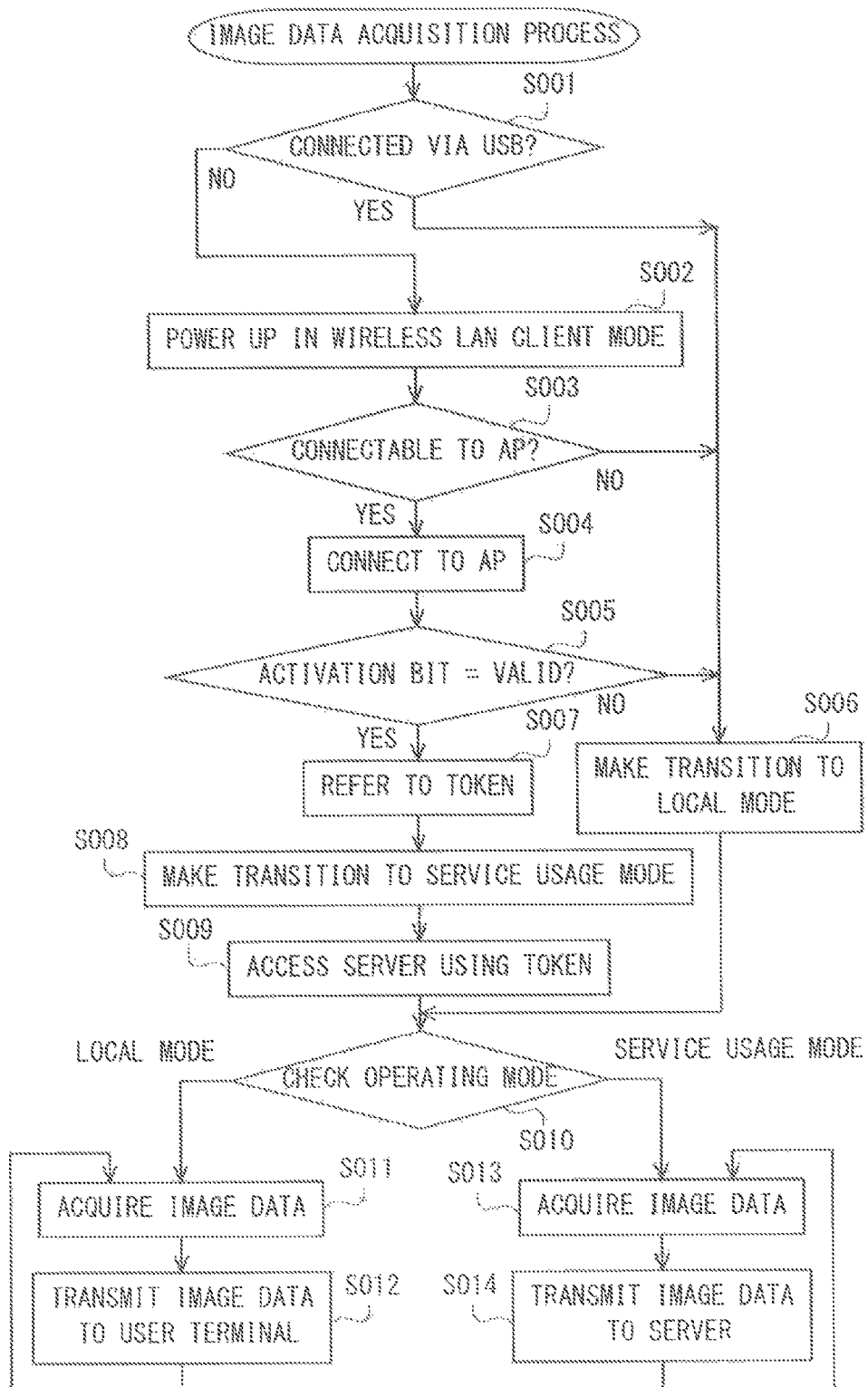
FIG. 5 is a flow chart showing an outline of a flow of an image data acquisition process according to an embodiment.

FIG. 5 is a flow chart showing an outline of a flow of an image data acquisition process according to the present embodiment. Execution of the process shown in the present flow chart is triggered by power-on of the scanner 3.

In step S001, a determination is made on whether or not the scanner 3 is connected to the user terminal 8 via a peripheral device interface. The scanner 3 determines whether or not the scanner 3 is connected to the user terminal 8 via a peripheral device interface by detecting device connection states at a communication interface such as a USB. When the scanner 3 is connected to the user terminal 8 via a peripheral device interface such as a USB, the process advances to step S006. On the other hand, when the scanner 3 is not connected to the user terminal 8 via a peripheral device interface such as a USB, the process advances to step S002.

In step S002, the scanner 3 is powered up in a wireless LAN client mode. In this case, the wireless LAN client mode refers to a mode in which the scanner 3 operates as a client (a device that connects to an access point) of a wireless LAN. Once the scanner 3 is powered up in the wireless LAN client mode, the process advances to step S003.

In step S003, a determination is made on whether or not the scanner 3 can connect to a wireless access point. The scanner 3 refers to one or a plurality of connection settings retained by the connection setting retaining unit 47 and determines whether or not a wireless access point having a corresponding connection setting exists within a radio communication range. When a wireless access point to which the scanner 3 can connect does not exist within a radio communication range, the process advances to step S006. On the other hand, when a wireless access point to which the scanner 3 can connect exists within a radio communication range, the process advances to step S004.

In step S004, a connection is made to a wireless access point. The scanner 3 connects to the wireless access point having been detected to be within communication range in step S003 and having a corresponding connection setting using the connection setting. Subsequently, the process proceeds to step S005.

In step S005, a determination is made on whether or not a service usage setting has been validated. The determining unit 48 refers to an activation bit in the connection setting which had been used to connect to an access point in step S004 and which is related to the access point and determines whether or not the activation bit is set to a value indicating "valid". When the service usage setting is validated, the process proceeds to step S007. On the other hand, when the service usage setting is not validated, the process proceeds to step S006.

In step S006, the operating mode of the scanner 3 makes a transition to a local mode. The scanner 3 causes a transition of the operating mode of the scanner 3 to the local mode. Thereafter, processes by the scanner 3 such as scanning are performed in the local mode. In other words, scanned data is transmitted to the user terminal 8 or 9 connected to the scanner 3 via a USB or a wireless LAN. Subsequently, the process proceeds to step S010.

In steps S007 to S009, a saved access token is referred to, the operating mode of the scanner 3 makes a transition to a service usage mode, and an access process to the server 1 is performed. The scanner 3 refers to an access token retained by the access permission retaining unit 45 (step S007) and causes the operating mode of the scanner 3 to make a transition to the service usage mode (step S008). Thereafter, processes by the scanner 3 such as scanning are performed in the service usage mode. In other words, scanned data is transmitted to the server 1 connected to the scanner 3 via a wireless access point. In addition, the service using unit 44 accesses the server 1 using the referred access token (step S009). Subsequently, the process proceeds to step S010.

In step S010, the operating mode of the scanner 3 is checked. When the operating mode is the local mode, the process proceeds to step S011. On the other hand, when the operating mode is the service usage mode, the process proceeds to step S013.

In steps S011 and S012, a scan process in the local mode is executed. When a scan operation by the user is detected, the scanner 3 scans an original document and acquires image data (step S011), and transmits the acquired image data to the local user terminal 8 or 9 connected via a USB or a wireless LAN (step S012). Subsequently, the process shown in the present flow chart is finished.

In steps S013 and S014, a scan process in the service usage mode is executed. When an operation of the scan button 38 is accepted by the user operation accepting unit 42 of the scanner 3, the image data acquiring unit 43 acquires image data of the original document by sending the original document to the imaging unit 37 using the sheet feeder 36 and causing the imaging unit 37 to capture an image of the original document (step S013). In addition, the service using unit 44 of the scanner 3 transmits the acquired image data to the image data processing server 1 via the access point (step S014). In doing so, an access token acquired in advance is used for the transmission.

In addition, transmission of image data by the service using unit 44 in the present embodiment is executed following the acquisition of the image data without involving operations by the user other than an operation of the scan button 38. The image receiving unit 24 of the image data processing server 1 receives image data transmitted from the scanner 3. In addition, by inspecting an access token that is received together with the image data, the image receiving unit 24 confirms whether or not the received image data has been transmitted from a user-authenticated scanner 3. When the received image data has not been transmitted by a user-authenticated scanner 3, the process shown in the present sequence diagram is finished (not illustrated). On the other hand, when the received image data has been transmitted by a user-authenticated scanner 3, upon completion of the image data process by the server 1, a completion notification and thumbnail image data are transmitted to the user terminal 9 from the result notifying unit 29 of the server 1 and the completion notification and the thumbnail image are displayed on the user terminal 9 (not illustrated). Subsequently, the process shown in the present flow chart is finished.

Figure 6:
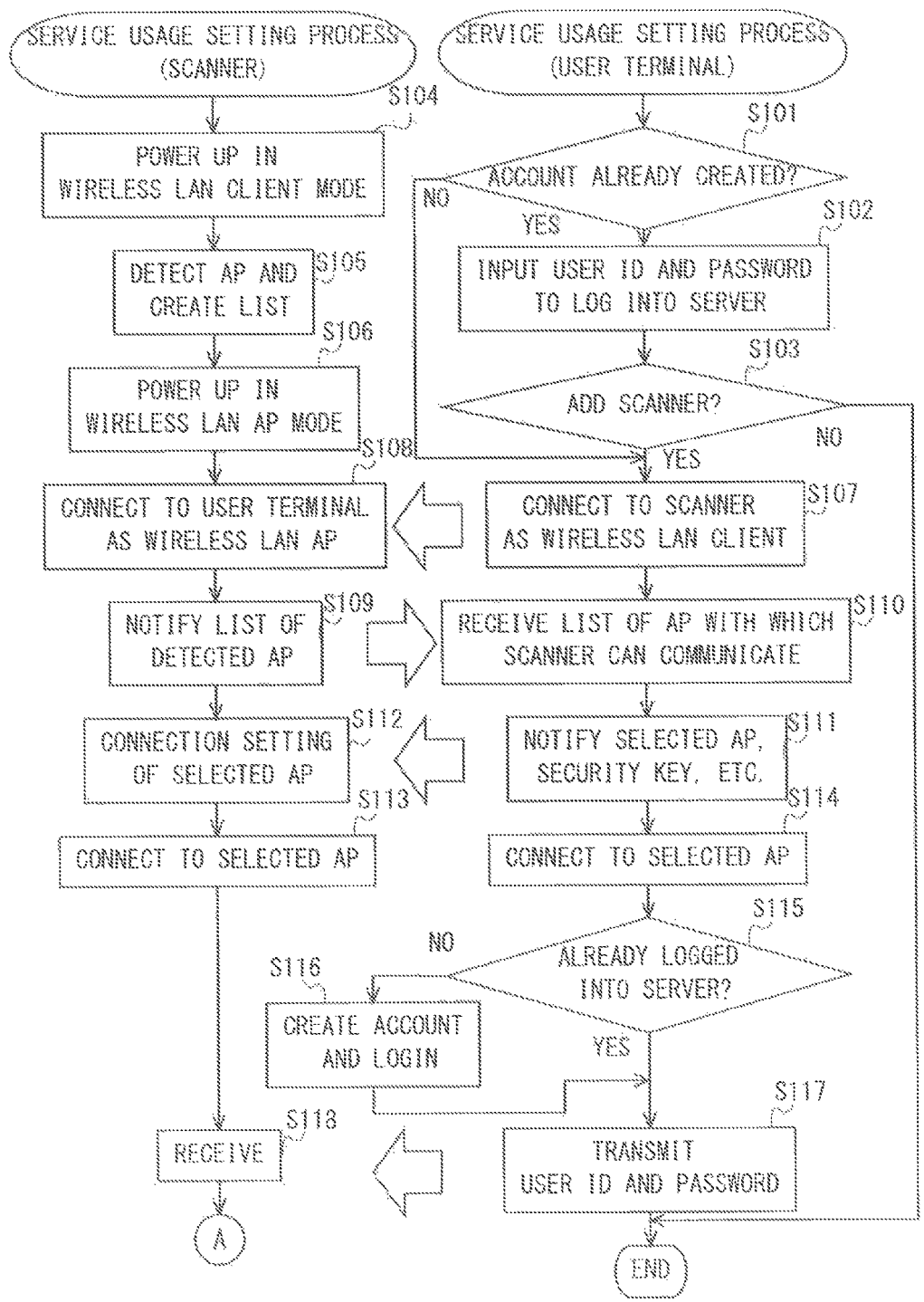
FIG. 6 is flow chart A showing an outline of a flow of a service usage setting process according to an embodiment.
Figure 7:
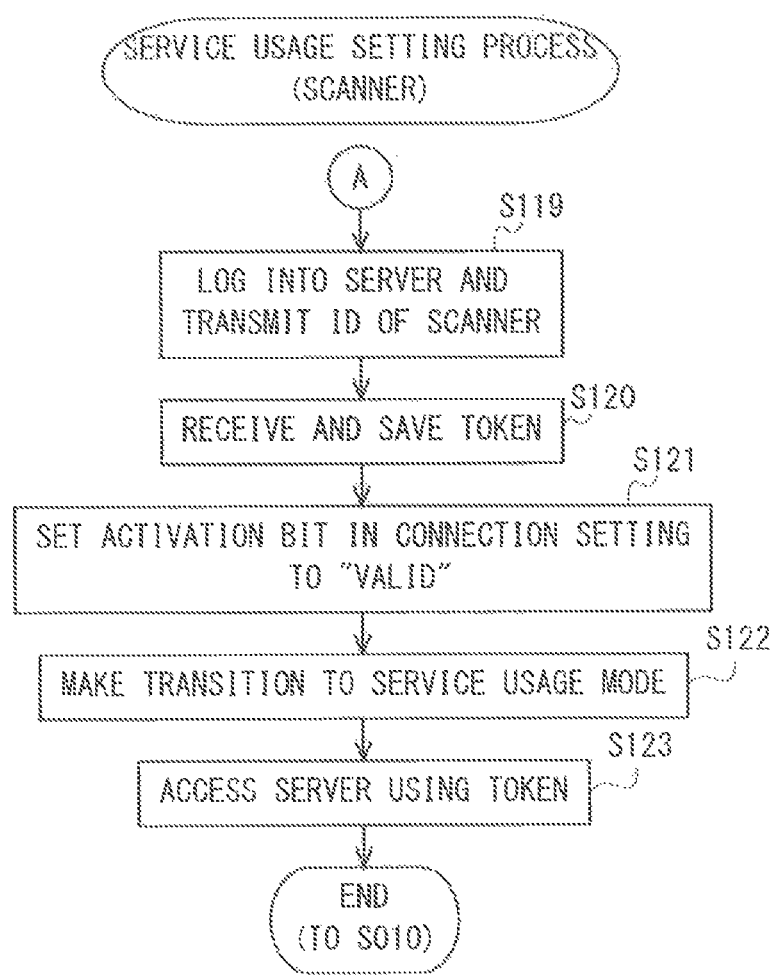
FIG. 7 is flow chart B showing an outline of a flow of a service usage setting process according to an embodiment.

FIGS. 6 and 7 are flow charts showing an outline of a flow of a service usage setting process according to the present embodiment. The process shown in the present flow chart is triggered by power-on of the service usage setting tool 97 at the user terminal 9 that is a smartphone or the like.

In step S101, a determination is made on whether or not a user account has already been created. The user terminal 9 executing the cloud setting tool determines whether or not a user account has already been created by querying the user on whether or not the user has an account for the service provided by the image data processing server. When an account has not been created, the process proceeds to step S107. On the other hand, when an account has been already created, the process proceeds to step S102.

In step S102, a login process to the image data processing server 1 is performed by the user terminal 9. The started service usage setting tool 97 prompts the user to input information (such as a user ID and a password) necessary for login and transmits the information input by the user to the image data processing server 1. In response to an authentication request transmitted from the user terminal 9, the image data processing server 1 authenticates the user of the user terminal 9. Specifically, upon receiving an authentication request from the user terminal 9, the image data processing server 1 verifies the authentication information contained in the authentication request, and when the authentication information matches the information on the account already created, the image data processing server 1 transmits an access token to the user terminal 9 that is the transmission source of the authentication request. The user terminal 9 having received the access token thereafter communicates with the image data processing server 1 using the received access token. In addition, the service usage setting tool 97 saves the authentication information (in the present embodiment, a user ID and a password) for logging into the created user account in the user terminal 9. Subsequently, the process proceeds to step S103.

In step S103, a determination is made on whether or not a scanner is to be added to the account of the user. The user terminal 9 executing the cloud setting tool determines whether or not to add a scanner by querying the user on whether or not a new scanner is to be added to the user's account. When a scanner is not to be added, the process shown in the present flow chart is finished. On the other hand, when a scanner is to be added, the process proceeds to step S107.

In steps S104 and S105, an access point within a communication range of the scanner 3 is detected. The scanner 3 powers on in the wireless LAN client mode (step S104), detects other access points within a range where radio communication can be performed, and retains a list of the detected access points (step S105). Subsequently, the process proceeds to step S106.

In steps S106 to S108, the user terminal 9 and the scanner 3 are directly connected to each other. In the present embodiment, when the user desires to perform a service usage setting on the scanner 3, the user powers up the scanner in advance in a wireless LAN access point mode according to a prescribed procedure. In this case, the wireless LAN access point mode refers to a mode in which the scanner 3 operates as an access point of a wireless LAN. As the prescribed procedure, for example, methods such as operating a switch provided on the scanner 3 and issuing a prescribed instruction from the user terminal 8 or 9 connected to the scanner 3 may be adopted. The scanner 3 is powered up in the wireless LAN access point mode in which the scanner 3 operates as an access point in a wireless LAN (step S106). The user terminal 9 directly connects as a wireless LAN client to the scanner 3 operating as an access point without involving other access points (steps S107 and S108). Subsequently, the process proceeds to step S109.

In steps S109 and S110, a list of access points within a communication range of the scanner 3 is acquired. The scanner 3 transmits a list retained in step S105 of other access points detected in step S105 to be within a range where radio communication can be performed to the wirelessly-connected user terminal 9 (step S109). Upon receiving the list of access points (Step S110), the user terminal 9 notifies the user by displaying the list of access points or the like. Subsequently, the process proceeds to step S111.

At this point, the user selects an access point that the user wishes to use when using the service at the scanner 3 from the list of access points (list of ESSIDs) notified from the user terminal 9 and instructs the selection result to the user terminal 9 via a displayed interface. In addition, the user inputs information (a security key and the like) necessary for communicating with the access point via the interface displayed on the user terminal 9.

In steps S111 and S112, a connection setting of the access point is performed. The user terminal 9 notifies information capable of identifying the selected access point and information necessary for communicating with the input access point to the scanner 3 (step S111). The setting unit 46 of the scanner 3 having received the notification performs a connection setting of the selected access point in accordance with the received information (step S112). The created connection setting is retained by the connection setting retaining unit 47. Subsequently, the process proceeds to step S113.

In steps S113 and S114, the scanner and the user terminal 9 are connected to the set access point. The scanner 3 on which a connection setting of an access point has been performed is restarted in the wireless LAN client mode and connects to the access point set in step S112 in accordance with the connection setting (step S113). In addition, the user terminal 9 connects to the access point selected by the user in step S111 using information input by the user (step S114). Accordingly, the scanner 3 and the user terminal 9 are to connect to a same access point and become capable of communicating with each other on a same local network. Subsequently, the process proceeds to step S115.

In step S115, a determination is made on whether or not the user terminal 9 has already logged into the server. When it is determined in step S101 that an account has been already created, since a login process has been performed in step S102, the user terminal 9 is already logged into the server and the process proceeds to step S117. On the other hand, when it is determined in step S101 that an account has not been created, since a login process has not been performed and an account must be created, the process proceeds to step S116.

In step S116, a user account is created. The service usage setting tool 97 prompts the user to input information (such as a user ID and a password) necessary to create an account and transmits the information input by the user to the image data processing server 1. The image data processing server 1 determines whether or not the information received from the user terminal 9 is appropriate, and when it is determined that the information is appropriate, creates an account of the user. In addition, the service usage setting tool 97 saves the authentication information (in the present embodiment, a user ID and a password) for logging into the created user account in the user terminal 9. Furthermore, after creating an account in the image data processing server 1, the service usage setting tool 97 causes the user terminal 9 to connect to the scanner 3 via a wireless network.

In steps S117 and S118, authentication information for logging into the server 1 is transmitted and received. The service usage setting tool 97 notifies the scanner 3 of authentication information which has been input in step S102 or S116 and saved in the user terminal 9 and which is to be used to log into the image data processing server 1 (step S117). The scanner 3 receives the authentication information transmitted from the user terminal 9 (step S118). The process by the service usage setting tool 97 ends at this point and, subsequently, the process proceeds to step S119.

In steps S119 and S120, a login process to the image data processing server 1 is performed by the scanner 3 and an access token is acquired. The authentication request transmitting unit 41 of the scanner 3 having received the notification of the authentication information transmits an authentication request including the authentication information and an ID (device identification information) of the scanner 3 to the image data processing server 1 (step S119). When the authentication request transmitted by the scanner 3 is received by the image data processing server 1, the user authenticating unit 21 of the image data processing server 1 authenticates the user of the scanner 3. The user authenticating unit 21 verifies the authentication information included in the authentication request that is received from the scanner 3, and when the authentication information is consistent with the account information created in step S101, the user authenticating unit 21 transmits an access token to the scanner 3 that is a transmission source of the authentication request. The scanner 3 having received the access token saves the access token (step S120) and thereafter communicates with the image data processing server 1 using the received access token.

In steps S121 to S123, service usage via the access point related to the set connection setting is validated and the scanner 3 makes a transition to the service usage mode. The service validating unit 49 sets an activation bit in the connection setting set using the service usage setting tool 97 to a value indicating "valid" (step S121). In addition, the scanner 3 causes the operating mode of the scanner 3 to make a transition to the service usage mode (step S122). Thereafter, processes by the scanner 3 such as scanning are performed in the service usage mode and scanned data is transmitted to the server 1 connected to the scanner 3 via a wireless access point. In addition, the service using unit 44 accesses the server 1 using the referred access token (step S123). Since the subsequent process is similar to the process in step S010 and thereafter described earlier with reference to FIG. 5, a description will be omitted.

According to the service usage setting process described above, reception of the service provided by the image data processing server 1 via an access point is only permitted with respect to the wireless access point set using the service usage setting tool 97 (activation bit: valid). On the other hand, with respect to an access point not set using the service usage setting tool 97 (for example, a wireless access point set using the access point setting tool 81), reception of the service via the access point is not permitted (activation bit: invalid).

FIG. 8 is a diagram for explaining a usage state of a service when the scanner 3 according to the present embodiment is actually operated.

First, as a user A introduces the scanner 3 and sets an access point α and an account of the user A at the image data processing server using the service usage setting tool 97, a service usage setting in the connection setting of the access point α is validated (activation bit: valid). In addition, the scanner 3 acquires an access token of the user A (a token A in FIG. 8) from the image data processing server in accordance with the account setting at the image data processing server and retains the access token in the scanner 3. Therefore, the scanner 3 can communicate with the image data processing server using the access token of the user A (the token A), and the user A can receive the service provided by the image data processing server including saving an image obtained by a scan in a server (cloud).

Subsequently, when the user A transfers the scanner 3 to a user B without erasing the service usage setting or the like, the access token (the token A) that enables service to be received as the user A from the image data processing server is still retained in the scanner 3. However, while the user B performs setting of a new access point β in order to use the scanner 3 in a new local network environment, a service usage setting in a connection setting of the access point β is not validated if the setting is performed using the access point setting tool 81. As a result, with respect to communication performed via the access point β, the scanner 3 cannot communicate with the image data processing server using the access token of the user A (the token A) and the user B cannot receive the service provided by the image data processing server. In other words, with the system according to the present embodiment, even in the event where, for example, the user A transfers the scanner 3 to another person without erasing the service usage setting, the account of the user A can be prevented from being used. Moreover, even in this state, the user B can operate the scanner 3 in the local mode and cause the scanner 3 to transmit a scanned image to the user terminal 8 connected via a USB or a wireless LAN.

Subsequently, as the user B sets the access point β and an account of the user B at the image data processing server using the service usage setting tool 97, a service usage setting in the connection setting of the access point β is validated (activation bit: valid). The scanner 3 acquires an access token of the user B (a token B) from the image data processing server in accordance with the account setting at the image data processing server and overwrites the access token of the user A (the token A) retained in the scanner 3 with the access token of the user B (the token B). Therefore, the scanner 3 can communicate with the image data processing server using the access token of the user B (the token B), and the user B can receive the service provided by the image data processing server.

Advantageous Effects

As described above, with the system described in the present embodiment, by enabling use of a service via access points only with respect to access points for which a connection setting is performed using the service usage setting tool 97 that enables setting of an access point and setting of a service to be set in a series of procedures, an account of a previous user can be prevented from being used in the event where the scanner 3 is transferred and the like.

Moreover, while an example where the scanner 3 is used as an information processing device has been described in the present embodiment, the information processing device may be devices of other types which communicate with a server providing a service via a network. For example, the information processing device according to the present invention may be imaging devices of other types such as a camera or devices such as a personal computer. In addition, while an example where data transmitted to a server is image data has been described in the present embodiment, the data transmitted to the server may be data of other types.

What is claimed is:

1. An information processing device comprising:
    a nonvolatile storage device to retain a connection setting of a connection to a relay device that relays communication to a network for each relay device, the connection setting including a service usage setting indicating whether or not a prescribed service provided by a server on the network is to be used, and the nonvolatile storage device retaining an access permission for using the prescribed service; and
    a processor to perform the connection setting and a usage setting of the prescribed service, by communicating with a user terminal that executes software as a tool that enables the connection setting and the usage setting of the prescribed service to be set in a series of procedures,
    the user terminal having acquired an access permission to use the prescribed service,
    the processor validating the service usage setting in the connection setting when the connection setting is a connection setting set using the tool,
    the processor determining whether or not the connection setting is a connection setting having been set using the tool, by referring to the service usage setting, and
    the processor using the prescribed service using the access permission in a communication relayed by a relay device related to a connection setting determined to be a connection setting having been set using the tool.

2. The information processing device according to claim 1, wherein the processor does not validate the service usage setting in the connection setting when the connection setting is not a connection setting set using the tool.

3. The information processing device according to claim 1, wherein when an access permission is already being retained by the non-volatile storage device upon performing a usage setting of the prescribed service by the processor, the processor overwrites the retained access permission with an access permission related to a new usage setting.

4. The information processing device according to claim 1, wherein the processor transmits, to the server, an authentication request including authentication information notified from the user terminal executing the software to the information processing device, and
    wherein the processor retains an access permission obtained from the server as a result of the authentication request.

5. The information processing device according to claim 1, wherein the processor transmits data transmitted from the information processing device to an account of the user for the prescribed service, using the access permission.

6. The information processing device according to claim 5, wherein the information processing device includes an imaging device, and the data is image data read by the imaging device.

7. A system comprising an information processing device and a user terminal capable of communicating with each other, wherein
    the information processing device includes:
    a nonvolatile storage device to retain a connection setting of a connection to a relay device that relays communication to a network for each relay device, the connection setting including a service usage setting indicating whether or not a prescribed service provided by a server on the network is to be used, and the nonvolatile storage device retaining an access permission for using the prescribed service; and
    a first processor to perform the connection setting and a usage setting of the prescribed service, by communicating with a user terminal that executes software as a tool that enables the connection setting and the usage setting of the prescribed service to be set in a series of procedures, the user terminal having acquired an access permission to use the prescribed service, the first processor to validate the service usage setting in the connection setting when the connection setting is a connection setting set using the tool, the first processor to determine whether or not the connection setting is a connection setting having been set using the tool, by referring to the service usage setting, the first processor to use the prescribed service, using the access permission in a communication relayed by a relay device related to a connection setting determined to be a connection setting having been set using the tool, and the first processor to communicate with the user terminal to perform the connection setting and a usage setting of the prescribed service, and
    the user terminal includes a second processor to acquire an access permission for using a prescribed service provided by a server on the network and the second processor to communicate with the information processing device in a state, where the access permission has been acquired, and to provide a user with a tool that enables the connection setting and a usage setting for using the prescribed service in use of the access permission to be set in a series of procedures.

8. An image data processing method operating a computer to execute:
    retaining a connection setting of a connection to a relay device that relays communication to a network for each relay device, the connection setting including a service usage setting indicating whether or not a prescribed service provided by a server on the network is to be used;
    performing the connection setting and a usage setting of the prescribed service, by communicating with a user terminal that executes software as a tool that enables the connection setting and the usage setting of the prescribed service to be set in a series of procedures, the user terminal having acquired an access permission for using the prescribed service provided by the server on the network;
    validating the service usage setting in the connection setting when the connection setting is a connection setting set using the tool;
    determining whether or not the connection setting is a connection setting having been set using a tool that enables the connection setting and a usage setting of the prescribed service to be set in a series of procedures; and
    using the prescribed service using the access permission in a communication relayed by a relay device related to a connection setting determined to be a connection setting having been set using the tool.

9. A non-transitory computer-readable medium on which is recorded an image data processing program causing a computer to execute:
    retaining a connection setting of a connection to a relay device that relays communication to a network for each relay device, the connection setting including a service usage setting indicating whether or not a prescribed service provided by a server on the network is to be used;

performing the connection setting and a usage setting of the prescribed service, by communicating with a user terminal that executes software as a tool that enables the connection setting and the usage setting of the prescribed service to be set in a series of procedures, the user terminal having acquired an access permission for using the prescribed service provided by the server on the network;

validating the service usage setting in the connection setting when the connection setting is a connection setting set using the tool;

determining whether or not the connection setting is a connection setting having been set using a tool that enables the connection setting and a usage setting of the prescribed service to be set in a series of procedures; and using the prescribed service using the access permission in a communication relayed by a relay device related to a connection setting determined to be a connection setting having been set using the tool.

* * * * *